United States Patent

[11] 3,590,789

| [72] | Inventors | Klaus Wiebicke;<br>Georg Jaeckel, both of Nurnberg, Germany |
|---|---|---|
| [21] | Appl. No. | 9,164 |
| [22] | Filed | Feb. 6, 1970 |
| [45] | Patented | July 6, 1971 |
| [73] | Assignee | Maschinenfabrik Augsburg-Nurnberg Aktiengesellschaft<br>Nurnberg, Germany |
| [32] | Priority | Feb. 8, 1969 |
| [33] | | Germany |
| [31] | | P 19 06 443.8 |

[54] CYLINDER HEAD FOR A FUEL INJECTION INTERNAL COMBUSTION ENGINE
1 Claim, 2 Drawing Figs.

[52] U.S. Cl. ............................................. 123/30,
 123/41.31, 123/188, 123/191
[51] Int. Cl. ....................................................... F02b 3/00,
 F02b 23/00
[50] Field of Search ................................................ 123/30.2,
 30, 32, 30.1, 41.82, 41.76, 41.77, 75 B, 188.1 M,
 191 O

[56] References Cited
UNITED STATES PATENTS

| 2,785,664 | 3/1957 | Goldsmith | 123/41.31 |
|---|---|---|---|
| 2,898,895 | 8/1959 | Koppel et al. | 123/41.31 |
| 3,054,390 | 9/1962 | Meurer et al. | 123/30 (.2) |
| 3,240,190 | 3/1966 | Christian et al. | 123/30 (.2) |
| 3,315,652 | 4/1967 | Ries et al. | 123/41.31 |

FOREIGN PATENTS

| 1,264,423 | 5/1961 | France | 123/191.0 |
|---|---|---|---|
| 844,995 | 8/1960 | Great Britain | 123/30 (.2) |
| 899,760 | 6/1962 | Great Britain | 123/30 (.2) |
| 914,745 | 1/1963 | Great Britain | 123/30 (.2) |

*Primary Examiner*—Al Lawrence Smith
*Attorneys*—Francis D. Stephens and Hugo Huettig, Jr.

ABSTRACT: Two intake air valves are used to produce a unidirectional air swirl in the cylinder of a fuel injection internal combustion engine. The air swirl velocity profile lies between $v$ = constant and $v/r$ = constant wherein $v$ is the air swirl velocity and $r$ is the cylinder radius.

INVENTORS
Klaus Wiebicke
Georg Jaeckel

CYLINDER HEAD FOR A FUEL INJECTION INTERNAL COMBUSTION ENGINE

This invention relates to a cylinder head for a compressed air and direct fuel injection internal combustion engine in which the fuel is directly sprayed onto the wall of the combustion chamber. The cylinder head has two air intake valves lying on a line parallel to the center of the engine cylinder and two exhaust valves. The corresponding intake and exhaust channels lie, respectively, on opposite sides of the cylinder head and are approximately parallel to the bottom of the head. The first air intake channel is used to produce an intensive unidirectional air swirl around the cylinder axis and extends tangentially to the first intake valve. The other air intake channel starts initially tangentially towards its respective valve but, inasmuch as that direction is opposite the direction of the air swirl in the cylinder, is recurved toward its valve so as to direct air through the valve in the unidirectional air swirl direction.

Such a cylinder head has been disclosed in French Pat. No. 1,263,699, the U.S. duplicate of which is U.S. Pat. No. 3,054,390. It was developed especially in order to maintain a very low structural overall engine height and, despite the constricting structural construction, moreover has a number of other advantages. Thus it is possible, according to the French Pat. disclosure, to make a simple combination of three cylinders, each with 240° ignition distance, and connect the cylinders to a single air intake pipe. The bolt holes for the cylinder head can be arranged approximately symmetrically around the cylinder and thus an unsymmetrical deformation of the seal or gasket and a blowing out of the gasket is avoided. A tilt lever shaft extending parallel to the longitudinal engine axis avoids the possibility of different or varying intake valve lifts and finally the arrangement of the intake channels makes possible a small cylinder size even in the very low overall structural height.

This cylinder is used with a fuel combustion method in which the major portion of the fuel is sprayed as a thin film on the wall of the combustion chamber positioned in the center of the piston and then is slowly and gradually removed from the wall by the air swirl and is vaporized before being burned. This method is especially characterized by a low ratio of the peak pressure to the mean effective pressure.

In order to obtain the highest possible power from such a motor, the rotation frequency of the combustion air swirl within the cylinder is of decisive significance and this, in turn, is dependent upon the construction and arrangement of the intake valves and intake air ducts. It is also very important in order to spread as large a portion of the fuel onto the wall of the combustion chamber to determine the best possible position for the fuel injection nozzle and to determine especially the most favorable point where the fuel jet leaves the nozzle and to maintain that point. It also has to be taken into consideration in making such a cylinder head that in highly heated engines there must be present a sufficient cooling of the fuel injection nozzle and that this nozzle can be easily installed, removed and/or exchanged.

The object of this invention is to improve upon the aforedescribed cylinder head with all of its advantages and/or to construct and position the parts which border it in such a way that the best possible power is achieved despite the restricted structural space and without incurring any disadvantages.

In general, these objects are obtained in this invention in that the distance between the parallel line passing through the intake valves centers from the line passing through the center of the engine cylinder amounts to about 0.15 times the diameter of the cylinder, that the bore for the fuel injection nozzle is positioned eccentrically between the two intake air ducts and is surrounded by a cooling water chamber, that the point where the fuel jet leaves the injection nozzle lies at a distance of $$R = \sqrt[3]{\frac{D^2}{5.21}\left(\frac{xD}{e-1}-1\right)}$$

from the center of the cylinder, wherein D is the cylinder diameter, x the ratio of the stroke to the diameter of the cylinder, and e the compression ratio. The fuel intake air channel is formed so that the initial air flow direction is changed into a second flow path for increasing the engine power and which second intake channel in combination with the first intake channel produce a flow of air in the cylinder in such a manner that given a constant longitudinal velocity within the cylinder of 10 m/sec, the ratio of the air rotation frequency, measured at a distance of 0.7 D, to the engine frequency is equal to five, and that the velocity profile in radial direction lies between $v =$ constant and $v/r =$ constant, wherein $v$ is the air velocity in the cylinder and $r$ the cylinder radius.

In this construction, for obtaining complete power, the distances for the valves, the fuel injection nozzle, or the point where the fuel is emitted from the nozzle, or the point where the fuel is emitted from the nozzle are fully retained and maintained. However, it is necessary that the second intake air channel has to be arranged in a somewhat constricted manner. By giving it a corresponding configuration, the second airflow path created carries with it a substantial advantage for the fuel combustion. This is based on the knowledge that changes in the diameter and form of the channel wall have a great influence on the channel itself. However, in connection with the intake valve, especially when using torque channels, this influence on the degree or extent of air delivery is small since the subsequently following extension of the diameter and the unsymmetrical flow-through through the valve opening have the greatest influence which can be observed at any time by the coefficient or flow-through factor. With regard to the surface of the flow-through area in a valve opening, these amount to, for example, of approximately 0.3 for $h/di$, wherein $h$ is the valve lift and $di$ the free diameter of the valve; approximately 0.7 in channels without a masked valve and a weak rotation frequency around the cylinder axis, while they amount to approximately 0.4 for middle flow-through velocities of 10 m/sec. and 200 Hz. rotation frequency within the cylinder, and for the channels alone amounts to approximately 0.95. On the basis of this knowledge, it is therefor possible that the second intake channel can remain in the cylinder head as disclosed in the aforesaid French Pat., No. 1,263,699, and can be shaped in such a manner that by means of the second flow path in the intake duct a substantially improved power is obtained.

The means by which the objects of this invention are obtained are described more fully with reference to the accompanying drawings in which.

Figure 1:
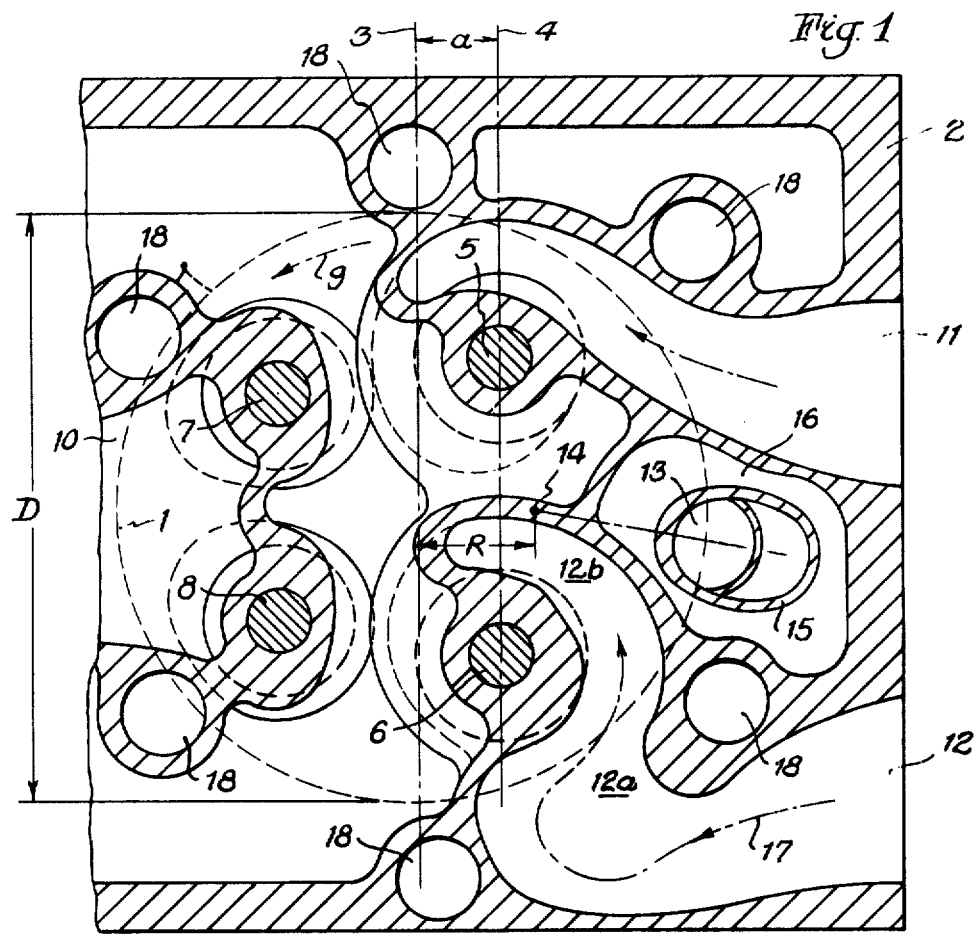
FIG. 1 is a horizontal cross-sectional view through the cylinder head.

As shown in FIG. 1, above the engine cylinder 1, shown in a dash-dash line, of an internal combustion engine for a cylinder head 2 from a line 3 extending through the center of longitudinal axis of the engine and at a distance $a$ is a parallel line 4 on which lie the intake air valves 5 and 6. On the opposite side of the line 3 are two exhaust valves 7 and 8. The combustion air swirl within cylinder 1 rotates in the direction of the arrow 9. Cylinder 1 has a diameter D. The exhaust valves 7 and 8 have a common exhaust gas channel 10. The intake air valves 5 and 6 each have a separate intake air channel 11 and 12, respectively, which extends approximately parallel to the bottom of the cylinder head. The first intake air channel 11 is directed tangentially toward the valve 5 for producing an intensive air swirl within cylinder 1 in the direction of the arrow 9.

A fuel nozzle bore is positioned between intake air channels 11 and 12 whose fuel jet emitting end or the point at which the fuel jet leaves the nozzle is spaced from the center of the cylinder 1 by a distance of $$R = \sqrt[3]{\frac{D^2}{5.21}\left(\frac{xD}{e-1}-1\right)}$$

so that the injected fuel is spread on the combustion chamber wall in a manner most favorable. The bore 13 is surrounded by a wall 15 which forms the inner wall of a cooling water chamber 16 which is outwardly bundled by the walls of the intake air channels 11 and 12.

Because of the position of fuel injection nozzle bore 13 between the channels 11 and 12, it is not possible to construct the second intake air channel 12 also in the form of a channel tangentially reaching the valve so that it can directly impart to the intake air the same rotational movement as given by channel 11. Intake air channel 12 initially starts tangentially of the valve 6 in the direction indicated by arrow 17. However, this air flow direction in the first portion of channel 12 would produce an air swirl in the cylinder directly opposite the desired direction of air swirl as shown by arrow 9. Consequently, the channel is recurved at the zone 12a to form a second flow path 12b so that the air enters the cylinder in the same direction as the air swirl indicated by arrow 9.

The desired course of airflow and/or the second flow path in channel 12 and the variations in the cross sections within the channels can be influenced by the form or shape of the channel in such a way they together with the tangentially directed channel 11 can produce a flow of intake air into the cylinder to achieve the objects of this invention. Bolt holes 18 are shown symmetrically surrounding the cylinder.

Figure 2:
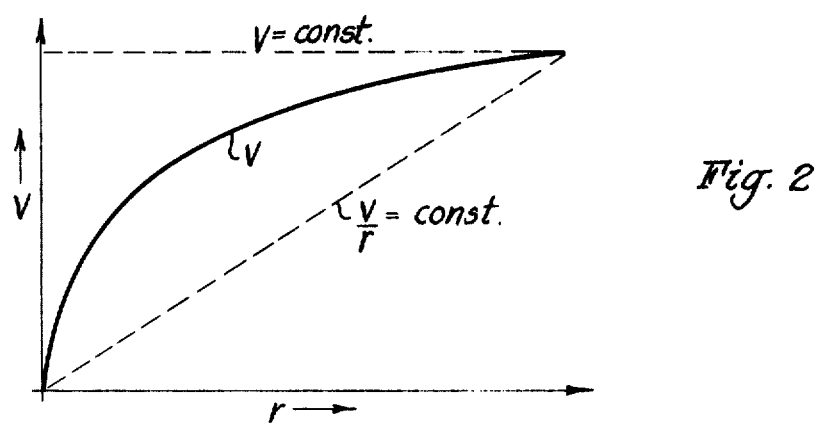
FIG. 2 is a graph representing the air velocity in the engine cylinder as seen in a radial direction.

As shown in FIG. 2, the velocity $v$ of the air is plotted as the ordinate and the radius $r$ of the cylinder 1 is plotted as the abscissa. In accordance with this invention, the two air intake channels 11 and 12 produce a longitudinal air velocity which lies between $v =$ constant and $v/r =$ constant and which, independent of the radius $r$, corresponds to the curve $v$. This velocity distribution produces excellent fuel combustion and thus an overall improved power for the engine.

Having now described the means by which the objects of this invention are obtained,

We claim:

1. A cylinder head for a compressed air and direct fuel injection internal combustion engine in which the injected fuel is spread on the wall of the combustion chamber comprising a head, two air intake valves lying on a line parallel to a line through the center of the engine cylinder, two exhaust valves, an air intake channel for each intake valve, an exhaust valves, an air intake channel for each intake valve, an exhaust gas channel for said exhaust valves, said intake channel and said exhaust gas channel, respectively, lying on opposite sides of said head and being approximately parallel to the bottom of said head, one intake channel extending tangentially to one intake valve for forming an intensive unidirectional air swirl around the center of said chamber, the other intake channel being started tangentially toward the other valve and then recurved toward said other valve to direct air through said other valve in the unidirectional direction, the distance ($a$) between said line (4) parallel to a line (3) through the center of the engine cylinder (1) being approximately 0.15 times the diameter (D) of the engine cylinder, a fuel nozzle bore (13) positioned off-center between the two intake channels (11,12), said bore being surrounded by a cooling water chamber (16), the point at which the fuel jet leaves the nozzle being spaced from the line (3) through the center of the engine cylinder a distance $$R = \sqrt[3]{\frac{D^2}{5.21}\left(\frac{xD}{e-1}-1\right)}$$

wherein D is the diameter of the engine cylinder, $x$ the ratio of the piston stroke to the cylinder diameter and $e$ the compression ratio, said intake channels together producing a flow of intake air into the engine cylinder in which, given a constant longitudinal air velocity in the engine cylinder of 10 m/sec, the ratio of the air rotation frequency, measured at a distance of 0.7 D, to the engine frequency is equal to five, and the velocity profile in radial direction lies between $v =$ constant and $v/r =$ constant, wherein $v$ is the air velocity and $r$ the engine cylinder radius, and whereby the air velocity in the cylinder equals the cylinder radius.